(12) United States Patent
Wakimoto et al.

(10) Patent No.: US 12,300,856 B2
(45) Date of Patent: May 13, 2025

(54) TERMINAL, SECONDARY BATTERY INCLUDING SAME, AND MANUFACTURING METHOD THEREOF

(71) Applicants: Prime Planet Energy & Solutions, Inc., Tokyo (JP); Fukui Byora Co., Ltd., Awara (JP)

(72) Inventors: Ryoichi Wakimoto, Kobe (JP); Eiichi Fujita, Sakai (JP); Taiki Nakagawa, Sakai (JP)

(73) Assignees: PRIME PLANET ENERGY & SOLUTIONS, INC., Tokyo (JP); FUKUI BYORA CO., LTD., Fukui (JP)

( * ) Notice: Subject to any disclaimer, the term of this patent is extended or adjusted under 35 U.S.C. 154(b) by 227 days.

(21) Appl. No.: 17/469,801

(22) Filed: Sep. 8, 2021

(65) Prior Publication Data

US 2022/0085462 A1    Mar. 17, 2022

(30) Foreign Application Priority Data

Sep. 17, 2020 (JP) .................................. 2020-155917

(51) Int. Cl.
*H01M 50/55* (2021.01)
*H01M 50/103* (2021.01)
(Continued)

(52) U.S. Cl.
CPC ......... *H01M 50/55* (2021.01); *H01M 50/557* (2021.01); *H01M 50/567* (2021.01); *H01M 50/103* (2021.01)

(58) Field of Classification Search
CPC .. H01M 50/55; H01M 50/557; H01M 50/567; H01M 50/103; H01M 50/562;
(Continued)

(56) References Cited

U.S. PATENT DOCUMENTS

| 4,358,518 A | 11/1982 | Matter |
| 2012/0058388 A1 | 3/2012 | Kim et al. |

(Continued)

FOREIGN PATENT DOCUMENTS

| CN | 102544423 A | 7/2012 |
| CN | 104904036 A | 9/2015 |

(Continued)

OTHER PUBLICATIONS

Office Action in U.S. Appl. No. 17/411,430, dated Jan. 19, 2023, 16 pages.
(Continued)

*Primary Examiner* — Ula C Ruddock
*Assistant Examiner* — Sarika Gupta
(74) *Attorney, Agent, or Firm* — HAUPTMAN HAM, LLP (57) ABSTRACT

According to the present disclosure, a terminal with improved conduction reliability is provided. The terminal disclosed herein includes a first conductive member that has a plate shape, a second conductive member electrically connected to the first conductive member, and a first fastening portion and a second fastening portion that mechanically fix the first conductive member and a flange portion of the second conductive member. The second fastening portion is provided further toward a center side of the flange portion than the first fastening portion when seen in a plan view.

16 Claims, 5 Drawing Sheets

(51) Int. Cl.
  *H01M 50/557* (2021.01)
  *H01M 50/567* (2021.01)
(58) Field of Classification Search
  CPC ............ H01M 50/564; H01M 50/566; H01M 50/571; H01M 50/552; H01M 10/04; H01M 50/172; H01M 50/188; H01M 50/533; Y02E 60/10; Y02P 70/50
  See application file for complete search history.

(56) References Cited

U.S. PATENT DOCUMENTS

| | | |
|---|---|---|
| 2012/0148908 A1 | 6/2012 | Ito |
| 2012/0177978 A1 | 7/2012 | Kim et al. |
| 2012/0225348 A1 | 9/2012 | Kim |
| 2014/0065897 A1 | 3/2014 | Kida et al. |
| 2015/0318519 A1 | 11/2015 | Tsutsumi et al. |
| 2016/0043353 A1 | 2/2016 | Tsutsumi et al. |
| 2016/0118641 A1 | 4/2016 | Oda et al. |
| 2017/0229700 A1* | 8/2017 | Matsumoto ......... H01M 50/176 |
| 2020/0108527 A1 | 4/2020 | Yamamoto et al. |
| 2020/0212415 A1 | 7/2020 | Muroya et al. |
| 2022/0085464 A1 | 3/2022 | Wakimoto |

FOREIGN PATENT DOCUMENTS

| | | | |
|---|---|---|---|
| CN | 106575741 A | | 4/2017 |
| CN | 111384355 A | | 7/2020 |
| EP | 2463937 B1 | | 11/2018 |
| JP | 2005285406 A | | 10/2005 |
| JP | 2012138342 A | | 7/2012 |
| JP | 2012146664 A | | 8/2012 |
| JP | 2013075297 A | | 4/2013 |
| JP | 2013222621 A | | 10/2013 |
| JP | 201411081 A | | 1/2014 |
| JP | 2014-222620 A | | 11/2014 |
| JP | 2014235870 A | | 12/2014 |
| JP | 201511849 A | | 1/2015 |
| JP | 2016085961 A | | 5/2016 |
| JP | 2016192322 A | | 11/2016 |
| JP | 2016-225106 A | | 12/2016 |
| JP | 2016207510 A | | 12/2016 |
| JP | 2017117574 A | | 6/2017 |
| JP | 6216368 B2 | | 10/2017 |
| JP | 2018-001209 A | | 1/2018 |
| JP | 2020-099940 A | | 7/2020 |
| JP | 2020-107464 A | | 7/2020 |
| WO | 2014103874 A1 | | 7/2014 |
| WO | 2016020996 A1 | | 2/2016 |

OTHER PUBLICATIONS

Final Office Action in U.S. Appl. No. 17/411,430, mailed Jun. 23, 2023, 20pp.
Notice of Allowance in U.S. Appl. No. 17/411,430, mailed Apr. 24, 2024, 8pp.
Final Office Action in U.S. Appl. No. 17/411,430, mailed Jan. 2, 2024, 23pp.

* cited by examiner

TERMINAL, SECONDARY BATTERY INCLUDING SAME, AND MANUFACTURING METHOD THEREOF

CROSS-REFERENCE TO RELATED APPLICATIONS

The application claims priority based on Japanese Patent Application No. 2020-155917 filed on Sep. 17, 2020, the content of which is incorporated herein by reference.

BACKGROUND OF THE DISCLOSURE

1. Technical Field

The present disclosure relates to a terminal, a secondary battery including the same, and a manufacturing method thereof.

2. Background

In general, a battery such as a lithium-ion secondary battery includes an electrode body having an electrode and a battery case accommodating the electrode body. In such a type of battery, a terminal electrically connected to an electrode inside a battery case and drawn out of the battery case is known. As prior art related to such a terminal, for example, Japanese Patent No. 6216368 discloses a terminal structure including a rivet member and a drawing member. The rivet member is electrically connected to an electrode inside a battery case and protrudes outward through a through hole of the battery case. The drawing member has a first through hole penetrating the rivet member and electrically connects the rivet member and a terminal bolt for external connection. As disclosed in Japanese Patent No. 6216368, the rivet member is inserted into the first through hole of the drawing member to crimp a tip end portion in an up-down direction, thereby crimping and fixing the rivet member to a peripheral edge portion surrounding the first through hole of the drawing member and electrically connecting the rivet member and the drawing member.

SUMMARY

However, according to studies by the inventors, there is room for improvement in the above-described technology. That is, an external force such as vibration or an impact may be applied to a battery from the outside during the use of the battery. Thereby, the crimped and fixed portion may wobble, thereby causing strain and generating a gap between the rivet member and the drawing member. As a result, there is a concern that conductive connection of a terminal may become unstable and defective connection may occur. Thus, it is required that conduction reliability of the terminal is improved.

The present disclosure has been made in view of the above-described circumstances, and an object thereof is to provide a terminal with improved conduction reliability, a secondary battery including the same, and a manufacturing method thereof.

According to the present disclosure, there is provided a terminal including a first conductive member that has a plate shape, a second conductive member that includes a flange portion electrically connected to the first conductive member, and a first fastening portion and a second fastening portion that mechanically fix the first conductive member and the flange portion of the second conductive member, wherein the second fastening portion is provided further toward a center side of the flange portion than the first fastening portion when seen in a plan view.

The terminal includes two fastening portions having different distances from the center of the flange portion. Thereby, even when vibration, an impact, or the like is applied from the outside, strain is less likely to occur, and it becomes easy to maintain a state where the first conductive member and the second conductive member are in close contact with each other. For this reason, it is possible to stably maintain conductive connection between the first conductive member and the second conductive member and to improve conduction reliability.

In a preferred aspect of the terminal disclosed herein, the first conductive member and the second conductive member are formed of metal, and the terminal further comprises a metal joining portion metal-joining the first conductive member and the flange portion of the second conductive member. The conductive members are connected to each other using the fastening portion and the metal joining portion, that is, two different types of joining methods, and thus it is possible to further improve conduction reliability of the terminal.

In a preferred aspect of the terminal disclosed herein, the metal joining portion is a welding joining portion. A metal joining portion with high strength can be stably formed by welding.

In a preferred aspect of the terminal disclosed herein, the metal joining portion is positioned between the first fastening portion and the second fastening portion when seen in a plan view. According to the study performed by the inventors, the metal joining portion has a relatively low strength (fragile) as compared with the fastening portion. Since such a metal joining portion is disposed between two fastening portions, it is thus possible to stably maintain the metal joining portion and increase the conduction reliability of the terminal for a long period of time.

In a preferred aspect of the terminal disclosed herein, the first conductive member has a through hole, the flange portion of the second conductive member has a protrusion to be inserted into the through hole, and the second fastening portion is configured such that the protrusion of the second conductive member is inserted into the through hole of the first conductive member. Thereby, it is possible to improve the strength of the second fastening portion.

In a preferred aspect of the terminal disclosed herein, the second fastening portion is a crimp portion in which a tip end of the protrusion is crimped to a peripheral edge portion of the through hole. Thereby, it is possible to improve workability at the time of forming the fastening portion.

In a preferred aspect of the terminal disclosed herein, the first conductive member has a recessed portion that accommodates at least a portion of the flange portion of the second conductive member, and the first fastening portion is configured such that an inner wall of the recessed portion of the first conductive member is fixed by a portion accommodated in the recessed portion of the second conductive member. Thereby, it is possible to improve the strength of the first fastening portion.

In a preferred aspect of the terminal disclosed herein, the flange portion of the second conductive member has a narrow portion fitted to the first conductive member, and the first fastening portion is a fitting portion in which the narrow portion of the second conductive member and the first conductive member are fitted to each other. The second conductive member has the narrow portion. Thus, for example, even when two conductive members are formed of different types of metals, these conductive members can be fixed suitably. In addition, it is possible to improve workability at the time of forming the fastening portion.

In a preferred aspect of the terminal disclosed herein, the narrow portion is formed continuously or intermittently to have an annular shape on a side surface of the flange portion. Thereby, it is possible form the first fastening portion having high strength against external forces applied from various angles and further improve conduction reliability of the terminal.

In a preferred aspect of the terminal disclosed herein, the first conductive member has a substantially rectangular shape, and the position of the center of the first conductive member and the position of the center of the flange portion of the second conductive member are shifted in a long side direction of the first conductive member. Thereby, in a case where multiple batteries are electrically connected to each other through a bus bar, it becomes easy to attach the bus bar to the first conductive member, and it is possible to increase conduction reliability of a battery pack.

In addition, according to the present disclosure, a secondary battery including the terminal is provided. Thereby, it is possible to improve reliability of the secondary battery.

In addition, according to the present disclosure, there is provided a terminal manufacturing method including a fastening step of mechanically fixing a first conductive member that has a plate shape and a flange portion of a second conductive member to form a first fastening portion and a second fastening portion that electrically connect the first conductive member and the second conductive member, wherein the second fastening portion is provided further toward a center side of the flange portion than the first fastening portion when seen in a plan view.

In the manufacturing method, two conductive members are mechanically fixed by two fastening portions having different distances from the center of the flange portion. Thereby, even when vibration, an impact, or the like is applied from the outside, strain is less likely to occur in the terminal, and it becomes easy to maintain a state where the first conductive member and the second conductive member are in close contact with each other. For this reason, it is possible to stably maintain conductive connection between the first conductive member and the second conductive member. Thus, it is possible to suitably manufacture the terminal with improved conduction reliability.

In a preferred aspect of the manufacturing method disclosed herein, in the fastening step, the second fastening portion is formed after the first fastening portion is formed. The first fastening portion positioned on an outer peripheral side is formed before the second fastening portion positioned on an inner peripheral side, and thus the first conductive member and the second conductive member can be firmly fixed and can be stably brought into close contact with each other. For this reason, it is possible to further improve conduction reliability of the terminal.

In a preferred aspect of the manufacturing method disclosed herein, the first conductive member and the second conductive member are formed of metal, and the terminal manufacturing method further comprises a metal joining step of forming a metal joining portion by metal-joining the first conductive member and the flange portion of the second conductive member after the fastening step. It is possible to further improve conduction reliability of the terminal by forming the metal joining portion between the first conductive member and the second conductive member. In addition, the metal joining portion is formed after the fastening step, and thus the metal joining portion having a stable shape can be formed with high accuracy.

In a preferred aspect of the manufacturing method disclosed herein, in the metal joining step, a welding joining portion is formed by welding the first conductive member and the flange portion of the second conductive member. The metal joining portion with high strength can be stably formed by welding.

In a preferred aspect of the manufacturing method disclosed herein, in the metal joining step, the metal joining portion is formed between the first fastening portion and the second fastening portion. The metal joining portion is formed between two fastening portions, so that a joining location is unlikely to be shifted at the time of joining, and workability can be improved. Further, in a case where the metal joining portion is formed by welding, a welding location hardly wobbles, and weldability can be improved.

In a preferred aspect of the manufacturing method disclosed herein, the first conductive member has a through hole, the flange portion of the second conductive member has a protrusion to be inserted into the through hole, and in the fastening step, the second fastening portion is formed by inserting the protrusion of the second conductive member into the through hole of the first conductive member and crimping a tip end of the protrusion to a peripheral edge portion of the through hole. Thereby, it is possible to improve the strength of the second fastening portion and improve workability at the time of forming the fastening portion.

In a preferred aspect of the manufacturing method disclosed herein, the first conductive member has a recessed portion that accommodates at least a portion of the flange portion of the second conductive member, and in the fastening step, the first fastening portion is formed by inserting a portion of the second conductive member into the recessed portion and deforming the recessed portion of the first conductive member along a contour of the second conductive member to fix an inner wall of the recessed portion by the second conductive member. Thereby, it is possible to improve the strength of the first fastening portion.

In a preferred aspect of the manufacturing method disclosed herein, the flange portion of the second conductive member has a narrow portion fitted to the first conductive member, and in the fastening step, the first fastening portion is formed by fitting the first conductive member to the narrow portion of the second conductive member. The second conductive member has the narrow portion. Thus, for example, even when two conductive members are formed of different types of metals, two conductive members can be fixed suitably. In addition, it is possible to improve workability at the time of forming the fastening portion.

In addition, according to the present disclosure, a secondary battery manufacturing method using a terminal manufactured by the terminal manufacturing method is provided. Thereby, it is possible to suitably manufacture the secondary battery with improved conduction reliability of the terminal.

DETAILED DESCRIPTION

Hereinafter, preferred embodiments of the technology disclosed herein will be described with reference to the drawings. Meanwhile, matters other than those specifically mentioned in the present specification and necessary for implementing the present disclosure (for example, general configurations and manufacturing processes for batteries that do not characterize the present disclosure) can be understood as design matters of those skilled in the art based on the prior art in the art. The present disclosure can be implemented on the basis of contents disclosed in the present specification and common general technical knowledge in the art.

Meanwhile, in the present specification, the term "battery" is a term that refers to a general power storage device capable of extracting electric energy, and is a concept that includes a primary battery and a secondary battery. Further, in the present specification, the term "secondary battery" is a term that refers to a general power storage device capable of repeatedly performing charging and discharging, and is a concept that includes a so-called storage battery (chemical battery) such as a lithium-ion secondary battery and a nickel hydride battery, and a capacitor (physical battery) such as an electric double layer capacitor.

Battery 100

Figure 1:
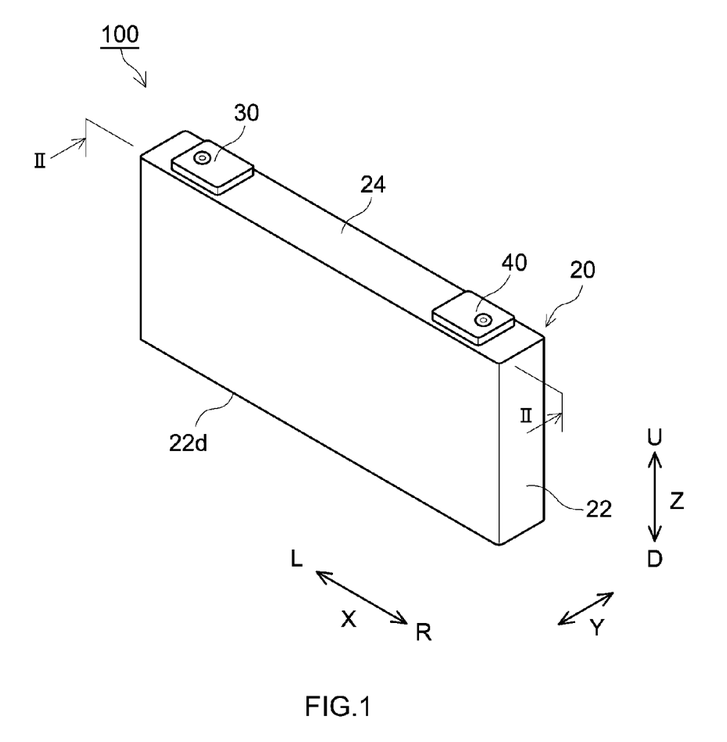
FIG. 1 is a perspective view schematically showing a battery according to an embodiment.
Figure 2:
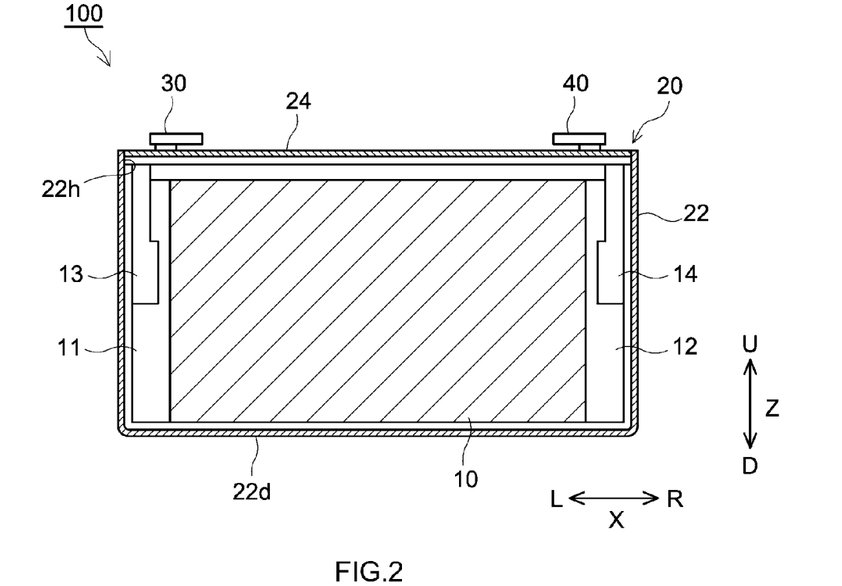
FIG. 2 is a schematic longitudinal sectional view taken along a line II-II in FIG. 1.

FIG. 1 is a perspective view of a battery 100. FIG. 2 is a schematic longitudinal sectional view taken along a line II-II in FIG. 1. Meanwhile, in the following description, signs L, R, U, and D in the drawings respectively represent left, right, up, and down, and signs X, Y, and Z in the drawings respectively represent a long side direction of the battery 100, a short side direction orthogonal to the long side direction, and an up-down direction. However, these are merely directions for convenience of description, and do not limit an installation form of the battery 100 at all.

As shown in FIG. 2, the battery 100 includes an electrode body 10, a battery case 20, a positive electrode terminal 30, and a negative electrode terminal 40. The battery 100 is characterized by including the positive electrode terminal 30 and/or the negative electrode terminal 40 disclosed here, and the configuration may otherwise be the same as that in the related art. Here, the battery 100 is a lithium-ion secondary battery. Although not shown in the drawing, the battery 100 further includes an electrolyte here. The battery 100 is configured such that the electrode body 10 and the electrolyte, not shown in the drawing, are accommodated in the battery case 20.

The electrode body 10 may be the same as that in the related art, and is not particularly limited. The electrode body 10 includes a positive electrode and a negative electrode (not shown). The electrode body 10 is, for example, a flat wound electrode body in which a band-shaped positive electrode and a band-shaped negative electrode are laminated in a state where the electrodes are insulated from each other by a band-shaped separator and wound around a winding shaft. However, the electrode body 10 may be a laminated electrode body in which a positive electrode having quadrangular shape (typically rectangular shape) and a negative electrode having a quadrangular shape (typically rectangular shape) are laminated in a state where the electrodes are insulated from each other. The positive electrode includes a positive electrode current collector 11 and a positive electrode mixture layer (not shown) stuck onto the positive electrode current collector 11. The positive electrode current collector 11 is formed of a conductive metal such as aluminum, an aluminum alloy, nickel, or stainless steel. The positive electrode mixture layer contains a positive electrode active material (for example, a lithium-transition metal compound oxide). The negative electrode includes a negative electrode current collector 12 and a negative electrode mixture layer (not shown) stuck onto the negative electrode current collector 12. The negative electrode current collector is formed of a conductive metal such as copper, a copper alloy, nickel, or stainless steel. The negative electrode mixture layer contains a negative electrode active material (a carbon material such as graphite).

As shown in FIG. 2, a laminated portion in which the positive electrode mixture layer and the negative electrode mixture layer are laminated in an insulated state is formed in a central portion of the electrode body 10 in the long side direction X. On the other hand, a portion (positive electrode current collector exposure portion) of the positive electrode current collector 11 having the positive electrode mixture layer not formed therein protrudes from the laminated portion in a left end portion of the electrode body 10 in the long side direction X. A positive electrode lead member 13 is attached to the positive electrode current collector exposure portion. The positive electrode lead member 13 may be formed of the same metal material as that of the positive electrode current collector 11, for example, a conductive metal such as aluminum, an aluminum alloy, nickel, or stainless steel. In addition, a portion (negative electrode current collector exposure portion) of the negative electrode current collector 12 having the negative electrode mixture layer not formed therein protrudes from the laminated portion in a right end portion of the electrode body 10 in the long side direction X. A negative electrode lead member 14 is attached to the negative electrode current collector exposure portion. The material (metal type) of the negative electrode lead member 14 may be different from that of the positive electrode lead member 13. The negative electrode lead member 14 may be formed of the same type of metal as that of the negative electrode current collector 12, for example, a conductive metal such as copper, a copper alloy, nickel, or stainless steel.

The electrolyte may be the same as that in the related art, and is not particularly limited. The electrolyte is, for example, a non-aqueous liquid electrolyte (non-aqueous electrolyte solution) containing a non-aqueous solvent and a supporting salt. The non-aqueous solvent contains carbonates such as ethylene carbonate, dimethyl carbonate, or ethyl methyl carbonate. The supporting salt is a fluorine-containing lithium salt such as $LiPF_6$. However, the electrolyte may be in a solid state (solid electrolyte) and may be integrated with the electrode body 10.

The battery case 20 is a housing that accommodates the electrode body 10. Here, the battery case 20 is formed in a flat and bottomed rectangular parallelepiped shape (square shape). However, the shape of the battery case 20 is not limited to a square shape and may be any shape such as a columnar shape. The material of the battery case 20 may be the same as that used hitherto and is not particularly limited. The battery case 20 is formed of a lightweight metal material having good thermal conductivity, such as aluminum, an aluminum alloy, or stainless steel. As shown in FIG. 2, the battery case 20 includes a case body 22 having an opening portion 22h, and a lid (sealing plate) 24 closing the opening portion 22h. The battery case 20 is integrally formed by the lid 24 being joined to a peripheral edge of the opening portion 22h of the case body 22 (for example, welding joining). The battery case 20 sealed airtightly.

The case body 22 has a flat plate-shaped bottom surface 22d. The lid 24 faces the bottom surface 22d of the case body 22. The lid 24 is attached to the case body 22 to close the opening portion 22h of the case body 22. Here, the lid 24 has a substantially rectangular shape. Meanwhile, in the present specification, the "substantially rectangular shape" is a term also including, for example, a shape in which a corner portion connecting a long side and a short side of a rectangular shape has an R shape, a shape having a notch in a corner portion thereof, and the like, in addition to a complete rectangular shape (rectangular shape).

As shown in FIG. 1, the positive electrode terminal 30 and the negative electrode terminal 40 protrude out of the battery case 20. Here, the positive electrode terminal 30 and the negative electrode terminal 40 protrude from the same surface (specifically, the lid 24) of the battery case 20. However, the positive electrode terminal 30 and the negative electrode terminal 40 may protrude from different surfaces of the battery case 20. The positive electrode terminal 30 and the negative electrode terminal 40 are disposed at both end portions of the lid 24 in the long side direction X. The positive electrode terminal 30 and/or the negative electrode terminal 40 is an example of a terminal disclosed herein.

The positive electrode terminal 30 is electrically connected to the positive electrode of the electrode body 10 through the positive electrode lead member 13 inside the battery case 20. The negative electrode terminal 40 is electrically connected to the negative electrode of the electrode body 10 through the negative electrode lead member 14 inside the battery case 20. Each of the positive electrode terminal 30 and the negative electrode terminal 40 is attached to the lid 24. The positive electrode terminal 30 and the negative electrode terminal 40 are insulated from the lid 24 through a gasket 50 (see FIG. 3) and an insulator 60 (see FIG. 3), respectively.

Figure 3:
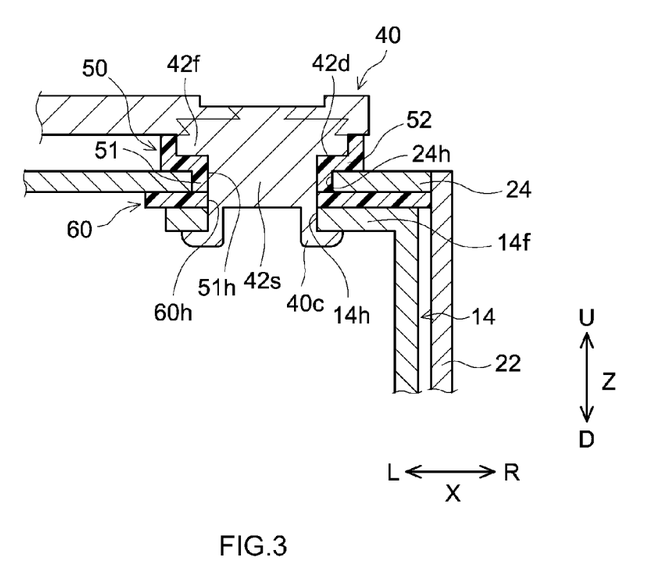
FIG. 3 is a partially enlarged cross-sectional view schematically showing the vicinity of a negative electrode terminal.

FIG. 3 is a partially enlarged cross-sectional view schematically showing the vicinity of the negative electrode terminal 40. Meanwhile, hereinafter, a terminal structure on the negative electrode terminal 40 side will be described as an example in detail, but this may be the same as for a terminal structure on the positive electrode terminal 30 side. In this case, in the following description, the term "negative electrode" can be appropriately reread as a "positive electrode".

As shown in FIG. 3, a terminal lead-out hole 24h is formed in the lid 24 in the up-down direction Z. When seen in a plan view, the terminal lead-out hole 24h has, for example, an annular shape (for example, a ring shape). The terminal lead-out hole 24h has such a large inner diameter that a shaft column portion 42s, which is to be described later, before crimping process of the negative electrode terminal 40 can be inserted thereinto. The terminal lead-out hole 24h is formed to be smaller than a flange portion 42f, which is to be described later, of the negative electrode terminal 40.

The negative electrode lead member 14 is attached to the negative electrode current collector exposure portion of the negative electrode current collector 12, and constitutes a conductive path electrically connecting the negative electrode and the negative electrode terminal 40. The negative electrode lead member 14 has a flat plate-like portion 14f extending horizontally along the inner surface of the lid 24. A through hole 14h is formed in the flat plate-like portion 14f at a position corresponding to the terminal lead-out hole 24h. The through hole 14h has such a large inner diameter that the shaft column portion 42s, which is to be described later, before crimping process of the negative electrode terminal 40 can be inserted thereinto. The negative electrode lead member 14 is fixed to the lid 24 in an insulated state through the insulator 60 by crimping process.

The gasket 50 is an insulating member which is disposed between the upper surface (outer surface) of the lid 24 and the negative electrode terminal 40. Here, the gasket 50 has a function of insulating the lid 24 and the negative electrode terminal 40 from each other and closing the terminal lead-out hole 24h. The gasket 50 has electrical insulation and is formed of a resin material being elastically deformable, for example, a fluororesin such as a perfluoroalkoxy alkane resin (PFA), a polyphenylene sulfide resin (PPS), aliphatic polyamide, or the like.

The gasket 50 includes a cylinder portion 51 and a base portion 52. The cylinder portion 51 is a portion that prevents direct contact between the lid 24 and the shaft column portion 42s of the negative electrode terminal 40. The cylinder portion 51 has a hollow cylindrical shape. The cylinder portion 51 has a through hole 51h formed in the up-down direction Z. The through hole 51h is formed such that the shaft column portion 42s of the negative electrode terminal 40 before crimping process is inserted thereinto. The cylinder portion 51 is inserted into the terminal lead-out hole 24h of the lid 24. The base portion 52 is a portion that prevents direct contact between the lid 24 and a flange portion 42f, which is to be described later, of the negative electrode terminal 40. The base portion 52 is connected to an upper end of the cylinder portion 51. The base portion 52 extends from the upper end of the cylinder portion 51 in a horizontal direction. The base portion 52 is formed to have, for example, a ring shape so as to surround the terminal lead-out hole 24h of the lid 24. The base portion 52 extends along the upper surface of the lid 24. The base portion 52 is interposed between a lower surface 42d of the flange portion 42f of the negative electrode terminal 40 and the upper surface of the lid 24 and is compressed in the up-down direction Z by crimping process.

The insulator 60 is an insulating member which is disposed between the lower surface (inner surface) of the lid 24 and the negative electrode lead member 14. The insulator 60 has a function of insulating the lid 24 and the negative electrode lead member 14 from each other. The insulator 60 is a flat plate-like portion extending horizontally along the inner surface of the lid 24. A through hole 60h is formed in the flat plate-like portion at a position corresponding to the terminal lead-out hole 24h. The through hole 60h has such an inner diameter size that the shaft column portion 42s of the negative electrode terminal 40 can be inserted thereinto. The insulator 60 has resistance to an electrolyte to be used and electrical insulation, and is formed of a resin material being elastically deformable, for example, a fluororesin such as a perfluoroalkoxy alkane resin (PFA), a polyphenylene sulfide resin (PPS), or the like. The flat plate-like portion of the insulator 60 is interposed between the lower surface of the lid 24 and the upper surface of the negative electrode lead member 14 and is compressed in the up-down direction Z by crimping process.

Negative Electrode Terminal 40

The negative electrode terminal 40 extends to the outside from the inside of the battery case 20 through the terminal lead-out hole 24h. As will be described later, the negative electrode terminal 40 is configured such that two types of conductive members, that is, a first conductive member 41 and a second conductive member 42 are mechanically fixed and/or joined together using a metal to be integrated with each other. As shown in FIG. 3, the negative electrode terminal 40 is crimped to a peripheral edge portion surrounding the terminal lead-out hole 24h of the lid 24 by crimping process in a state where the negative electrode terminal is insulated from the lid 24. A tack portion 40c is formed in a lower end portion of the negative electrode terminal 40. The negative electrode terminal 40 is fixed to the lid 24 by crimping process and is electrically connected to the negative electrode lead member 14.

Figure 4:
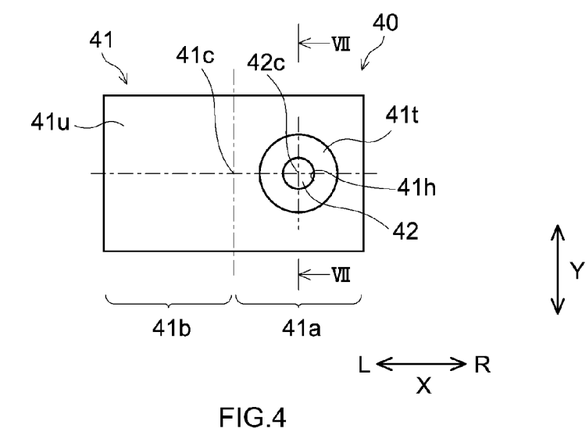
FIG. 4 is a plan view schematically showing a negative electrode terminal according to an embodiment.
Figure 5:
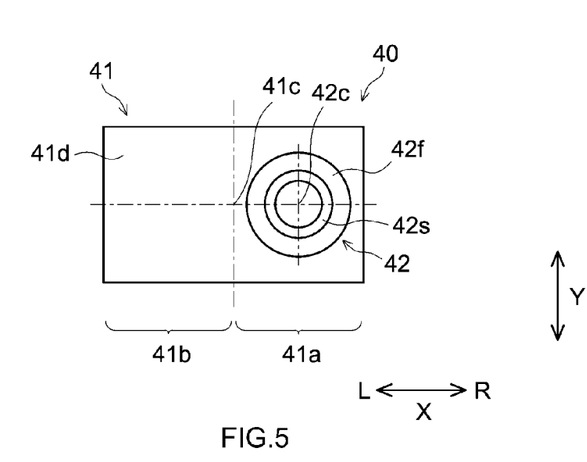
FIG. 5 is a bottom view schematically showing a negative electrode terminal according to an embodiment.
Figure 6:
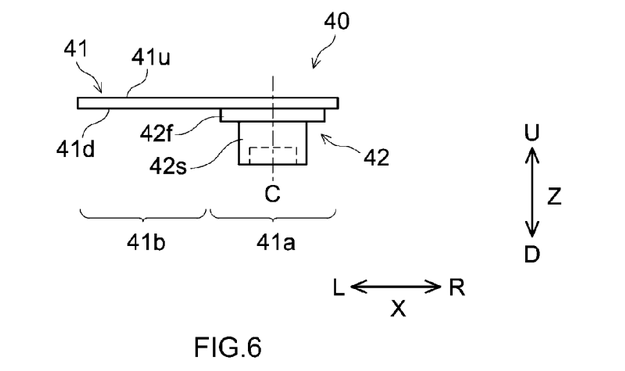
FIG. 6 is a side view schematically showing a negative electrode terminal according to an embodiment.
Figure 7:
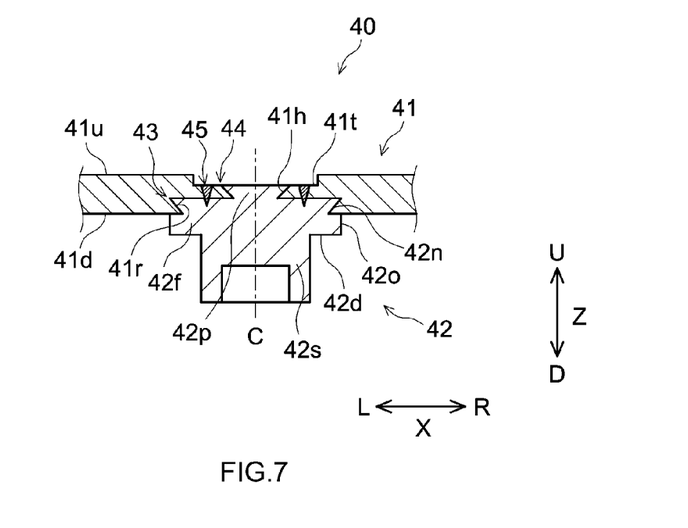
FIG. 7 is a schematic longitudinal sectional view taken along a line VII-VII in FIG. 4.

FIGS. 4 to 6 are schematic diagrams of the negative electrode terminal 40 before the negative electrode terminal is attached to the lid 24 (that is, before crimping process). FIG. 4 is a plan view, FIG. 5 is a bottom view, and FIG. 6 is a side view. In addition, FIG. 7 is a schematic longitudinal sectional view taken along a line VII-VII in FIG. 4, and is a longitudinal sectional view schematically showing main portions of the negative electrode terminal 40. As shown in FIG. 7, the negative electrode terminal 40 includes the first conductive member 41, the second conductive member 42, a first fastening portion 43, a second fastening portion 44, and a metal joining portion 45. The first conductive member 41 and the second conductive member 42 are integrated with each other through the first fastening portion 43, the second fastening portion 44, and the metal joining portion 45 and are electrically connected to each other. However, the metal joining portion 45 is not an essential portion and can be omitted in other embodiments.

The first conductive member 41 is a member which is installed outside the battery case 20. Here, the first conductive member 41 is formed of a metal. The first conductive member 41 is formed of a conductive metal such as aluminum, an aluminum alloy, nickel, or stainless steel. Here, the first conductive member 41 is formed of aluminum. The first conductive member 41 may be the same metal as the positive electrode lead member 13 or may be an alloy containing the same metallic element as a first component (a component having the highest mixing ratio by mass, and the same will apply hereinafter). As shown in FIGS. 4 to 6, the first conductive member 41 has a plate shape. Here, the first conductive member 41 has a flat plate shape. The first conductive member 41 includes a lower surface 41d and an upper surface 41u. The lower surface 41d is a surface on a side facing the battery case 20 (specifically, the lid 24). The upper surface 41u is a surface on a side separated from the battery case 20. Here, the first conductive member 41 has a substantially rectangular shape. The first conductive member 41 is a portion divided into two parts in the long side direction X, and includes a connection portion 41a electrically connected to the second conductive member 42 and an extending portion 41b extending from the connection portion 41a to one side (left sides in FIGS. 4 to 6) in the long side direction X.

As shown in FIG. 7, the connection portion 41a includes a thin portion 41t (also see FIG. 4) formed to be thinner than the extending portion 41b, a through hole 41h formed in the up-down direction Z, and a recessed portion 41r recessed from the lower surface 41d of the first conductive member 41. The thin portion 41t is provided with the second fastening portion 44 and the metal joining portion 45. As shown in FIG. 4, the thin portion 41t is formed to have an annular shape (for example, a ring shape) when seen in a plan view.

The through hole 41h is formed to have an annular shape (for example, a ring shape) when seen in a plan view. The second conductive member 42 (specifically, a protrusion 42p to be described later) is exposed from the through hole 41h on the upper surface 41u of the first conductive member 41. As shown in FIG. 7, the through hole 41h is provided in the central portion of the thin portion 41t. The through hole 41h is provided circumferentially inward from the first fastening portion 43 and the metal joining portion 45. Here, the through hole 41h is formed to have a tapered shape of which the diameter decreases toward the lower surface 41d (in other words, toward the recessed portion 41r). The protrusion 42p of the second conductive member 42 to be described later is inserted into the through hole 41h.

The recessed portion 41r is provided circumferentially outward from the second fastening portion 44 and the metal joining portion 45. Although not shown in the drawing, the recessed portion 41r is formed to have an annular shape (for example, a ring shape) when seen in a plan view. Here, the recessed portion 41r is formed to have a tapered shape of which the diameter decreases toward the lower surface 41d (in other words, as a distance from the second conductive member 42 decreases). A narrow portion 42n, which is to be described later, of the second conductive member 42 is inserted into the recessed portion 41r.

The extending portion 41b is a portion to which a bus bar 90 which is a conductive member (see FIG. 8) is attached in a case where a battery pack 200 (see FIG. 8) is manufactured, for example, by electrically connecting multiple batteries 100. By providing the extending portion 41b, it is possible to sufficiently secure a contact area with the bus bar 90 and improve conduction reliability of the battery pack 200. As shown in FIGS. 4 and 5, the first conductive member 41 includes the extending portion 41b, so that a center position 41c thereof is shifted to the right in the long side direction X from a center position (in detail, the center position of the flange portion 42f to be described later) 42c of the second conductive member 42.

The second conductive member 42 is a member extending to the outside from the inside of the battery case 20. Here, the second conductive member 42 is formed of a metal. The second conductive member 42 is formed of a conductive metal such as copper, a copper alloy, nickel, or stainless steel. Regarding the material of the second conductive member 42, for example, a first component may be the same as or different from that of the first conductive member 41. Here, the second conductive member 42 is formed of a metal having hardness higher than that of the first conductive member 41. Here, the second conductive member 42 is formed of copper. The second conductive member 42 may be the same metal as the negative electrode lead member 14 or may be an alloy containing the same metallic element as a first component. The second conductive member 42 may include a metal-coated portion in which a portion or the entirety of the surface thereof is coated with a metal such as Ni. Thereby, it is possible to improve corrosion resistance by increasing resistance to an electrolyte. As shown in FIGS. 6 and 7, the second conductive member 42 has an axial center C. The second conductive member 42 includes a flange portion 42f electrically connected to the first conductive member 41 and a shaft column portion 42s connected to a lower end portion of the flange portion 42f.

The flange portion 42f has a contour larger than that of the shaft column portion 42s. As shown in FIG. 3, the flange portion 42f has a contour larger than that of the terminal lead-out hole 24h of the lid 24. The flange portion 42f is a portion that protrudes out of the battery case 20 from the terminal lead-out hole 24h of the lid 24. As shown in FIGS. 5 to 7, here, the contour of the flange portion 42f is a substantially columnar shape. As shown in FIGS. 6 and 7, the axial center of the flange portion 42f matches the axial center C of the second conductive member 42. As shown in FIG. 7, the flange portion 42f includes the lower surface 42d, a side surface (outer peripheral surface) 42o extending upward from the lower surface 42d, a protrusion 42p protruding from the flange portion 42f, and the narrow portion 42n formed by narrowing a portion of the side surface 42o.

The protrusion 42p protrudes toward a side opposite to the shaft column portion 42s (upward in FIG. 7). The protrusion 42p is continuously or intermittently provided on the side surface 42o of the flange portion 42f. Although not shown in the drawing, the protrusion 42p is formed to have an annular shape (for example, a ring shape) when seen in a plan view. The protrusion 42p is formed to be axially symmetrical with respect to the axial center C of the flange portion 42f. The protrusion 42p is formed to have a reversed tapered shape of which the diameter increases toward the upper surface 41u (in other words, as a distance from the shaft column portion 42s increases). The protrusion 42p is inserted into the through hole 41h of the first conductive member 41. Here, the protrusion 42p is inserted into the through hole 41h of the first conductive member 41 to be fitted to the through hole 41h.

The narrow portion 42n is continuously or intermittently provided on a portion of the side surface 42o of the flange portion 42f. Although not shown in the drawing, the narrow portion 42n is formed to have an annular shape (for example, a ring shape) when seen in a plan view. When the narrow portion 42n is formed to have an annular shape, the first fastening portion 43 with high strength can be formed. The narrow portion 42n is formed to be axially symmetrical with respect to the axial center C of the flange portion 42f. The narrow portion 42n is formed to have a reversed tapered shape of which the diameter increases toward the upper surface 41u (in other words, as a distance from the shaft column portion 42s increases). The narrow portion 42n is inserted into the recessed portion 41r of the first conductive member 41. Here, the narrow portion 42n is inserted into the recessed portion 41r of the first conductive member 41 to be fitted to the recessed portion 41r. In the technology disclosed here, the narrow portion 42n is an example of "a portion accommodated in the recessed portion 41r".

As shown in FIG. 7, the shaft column portion 42s extends downward from the lower end portion of the flange portion 42f. As shown in FIGS. 5 to 7, here, the shaft column portion 42s has a cylindrical shape. The axial center of the shaft column portion 42s matches the axial center C of the flange portion 42f. Before crimping process, a lower end portion of the shaft column portion 42s, that is, an end on a side opposite to a side where the flange portion 42f is positioned has a hollow shape. As shown in FIG. 3, the shaft column portion 42s is a portion which is inserted into the terminal lead-out hole 24h of the lid 24 when the negative electrode terminal 40 is attached to the lid 24. The lower end portion of the shaft column portion 42s is a portion which is expanded by crimping process when the negative electrode terminal 40 is attached to the lid 24, and constitutes the tack portion 40c. The shaft column portion 42s is electrically connected to the negative electrode lead member 14 inside the battery case 20 by crimping process.

The first fastening portion 43 is a first fastening portion that mechanically fixes the first conductive member 41 and the flange portion 42f of the second conductive member 42. Here, the first fastening portion 43 is provided circumferentially outward from the flange portion 42f than the second fastening portion 44 and the metal joining portion 45 when seen in a plan view. The first fastening portion 43 is formed to have an annular shape (for example, a ring shape) when seen in a plan view. Thereby, it is possible to further improve conduction reliability of the negative electrode terminal 40 by increasing the strength of the first fastening portion 43. Although not particularly limited, the first fastening portion 43 is provided here on the lower surface 41d of the first conductive member 41. Specifically, the inner wall of the recessed portion 41r of the first conductive member 41 is configured to be fixed (for example, pressed and fixed) by the narrow portion 42n of the second conductive member 42. Thereby, it is possible to improve the strength of the first fastening portion 43.

A method of forming the first fastening portion 43 is not particularly limited as long as mechanical joining is performed using mechanical energy, and may be, for example, press fitting, shrink fitting, crimping, riveting, folding, bolt joining, or the like. In some preferred embodiments, the first fastening portion 43 is a fitting portion to which the recessed portion 41r of the first conductive member 41 and the narrow portion 42n of the second conductive member 42 are fitted. Thereby, for example, even when the first conductive member 41 and the second conductive member 42 are formed of different types of metals, the first conductive member 41 and the second conductive member 42 can be fixed suitably. The first fastening portion 43 may be, for example, a press fitting portion in which the narrow portion 42n of the second conductive member 42 is fitted to the recessed portion 41r of the first conductive member 41 by press fitting.

The second fastening portion 44 is a second fastening portion that mechanically fixes the first conductive member 41 and the flange portion 42f of the second conductive member 42. Here, the second fastening portion 44 is provided circumferentially inward (center side) from the flange portion 42f than the first fastening portion 43 and the metal joining portion 45 when seen in a plan view. The second fastening portion 44 is formed to have an annular shape (for example, a ring shape) when seen in a plan view. Thereby, it is possible to further improve conduction reliability of the negative electrode terminal 40 by increasing the strength of the second fastening portion 44. Although not particularly limited, the second fastening portion 44 is provided here on the upper surface 41u of the first conductive member 41. That is, the first fastening portion 43 is provided on one surface (the lower surface 41d) of the first conductive member 41, and the second fastening portion 44 is provided on the other surface (the upper surface 41u) of the first conductive member 41. Specifically, the protrusion 42p of the second conductive member 42 is configured to be inserted into the through hole 41h of the first conductive member 41. For example, the inner wall of the through hole 41h of the first conductive member 41 is configured to be fixed (for example, pressed and fixed) by the protrusion 42p of the second conductive member 42. Thereby, it is possible to improve the strength of the second fastening portion 44.

A method of forming the second fastening portion 44 is not particularly limited as long as mechanical joining is performed using mechanical energy, and may be, for example, press fitting, shrink fitting, crimping, riveting, folding, bolt joining, or the like. In some preferred embodiments, the second fastening portion 44 is a fitting portion to which the through hole 41h of the first conductive member 41 and the protrusion 42p of the second conductive member 42 are fitted. Thereby, for example, even when the first conductive member 41 and the second conductive member 42 are formed of different types of metals, the first conductive member 41 and the second conductive member 42 can be fixed suitably. The second fastening portion 44 may be, for example, a press fitting portion in which the protrusion 42p of the second conductive member 42 is fitted to the through hole 41h of the first conductive member 41 by pressing. In some preferred embodiments, the second fastening portion 44 is formed by the same fixing method as that for the first fastening portion 43 from the viewpoint of workability, or the like. For example, both the first fastening portion 43 and the second fastening portion 44 may be a press fitting portion.

As described above, the negative electrode terminal 40 includes two fastening portions having different distances from the center (axis center C) of the flange portion 42f, that is, the first fastening portion 43 and the second fastening portion 44. Thereby, even when vibration, an impact, or the like is applied from the outside, strain is less likely to occur in the negative electrode terminal 40, and it becomes easy to maintain a state where the first conductive member 41 and the second conductive member 42 are in close contact with each other. That is, the first conductive member 41 and the second conductive member 42 are hardly separated from each other. For this reason, it is possible to stably maintain conductive connection between the first conductive member 41 and the second conductive member 42 and to improve conduction reliability of the negative electrode terminal 40.

The metal joining portion 45 is a metallurgical joining portion between the first conductive member 41 and the flange portion 42f of the second conductive member 42. Here, the metal joining portion 45 is provided on the upper surface 41u of the first conductive member 41. The metal joining portion 45 is provided at a position separated from the through hole 41h. The metal joining portion 45 is provided circumferentially outward from the through hole 41h. The metal joining portion 45 is provided at a position separated from the first fastening portion 43 and the second fastening portion 44. The metal joining portion 45 may be a joining portion having a relatively high rigidity as compared with, for example, the first fastening portion 43 and/or the second fastening portion 44. The first conductive member 41 and the second conductive member 42 are connected to each other using the fastening portion and the metal joining portion, that is, two different types of joining methods, and thus it is possible to further improve conduction reliability of the negative electrode terminal 40.

Here, the metal joining portion 45 is provided between the first fastening portion 43 and the second fastening portion 44 when seen in a plan view. Since the metal joining portion 45 is formed using light energy, electron energy, thermal energy, or the like, the metal joining portion may be a joining portion having a relatively low strength (fragile) as compared with, for example, the first fastening portion 43 and/or the second fastening portion 44. Such a metal joining portion 45 is disposed between two fastening portions, and thus it is possible to stably maintain the metal joining portion 45 and increase conduction reliability of the negative electrode terminal 40 for a long period of time. Here, the metal joining portion 45 is provided in the thin portion 41t. Thereby, less energy is required at the time of joining, and weldability can be improved. The metal joining portion 45 is formed continuously or intermittently. The metal joining portion 45 is formed to be axially symmetrical with respect to the axial center C of the flange portion 42f. The metal joining portion 45 is formed to have an annular shape (for example, a ring shape) when seen in a plan view. Thereby, it is possible to further improve conduction reliability of the negative electrode terminal 40 by increasing the strength of the metal joining portion 45.

A method of forming the metal joining portion 45 is not particularly limited, and may be, for example, fusion welding, pressure welding, brazing, or the like. In some preferred embodiments, the metal joining portion 45 is a welding joining portion formed by welding such as laser welding, electron beam welding, ultrasonic welding, resistance welding, or tungsten inert gas (TIG) welding. Thereby, it is possible to stably form the metal joining portion 45 with high strength. However, the metal joining portion 45 may be formed by a method other than welding, for example, thermocompression bonding, ultrasonic pressure welding, brazing, or the like.

Method of Manufacturing Negative Electrode Terminal 40

Although not particularly limited, the negative electrode terminal 40 can be manufactured, for example, by preparing the above-described first conductive member 41 and second conductive member 42 and performing a manufacturing method typically including a fastening step and a metal joining step in this order. However, the order of the fastening step and the metal joining step may be reversed or may be substantially simultaneous. In addition, the metal joining step is not an essential step, and can also be omitted in other embodiments. In addition, the manufacturing method disclosed herein may further include other steps at any stage.

In the fastening step, the first conductive member 41 and the flange portion 42f of the second conductive member 42 are mechanically fixed to form the first fastening portion 43 and the second fastening portion 44. In some preferred embodiments, in the fastening step, the first fastening portion 43 positioned on a side relatively closer to an outer periphery is formed, and then the second fastening portion 44 positioned on a side relatively closer to an inner periphery is formed. Thereby, the first conductive member 41 and the second conductive member 42 can be firmly fixed and can be stably brought into close contact with each other. For this reason, it is possible to further improve conduction reliability of the negative electrode terminal 40. However, the first fastening portion 43 may be formed after the second fastening portion 44, and the first fastening portion 43 and the second fastening portion 44 may be formed substantially at the same time.

The first fastening portion 43 can be formed, for example, by inserting the narrow portion 42n of the second conductive member 42 into the recessed portion 41r of the first conductive member 41 and deforming the recessed portion 41r of the first conductive member 41 along the contour of the narrow portion 42n of the second conductive member 42 to fix the inner wall of the recessed portion 41r by the second conductive member 42. Thereby, it is possible to improve the strength of the first fastening portion 43. In some preferred embodiments, the first fastening portion 43 can be formed by fitting the recessed portion 41r of the first conductive member 41 and the narrow portion 42n of the second conductive member 42 to each other. For example, the first fastening portion 43 can be formed by horizontally press-fitting the narrow portion 42n of the second conductive member 42 to the recessed portion 41r of the first conductive member 41. Thereby, it is possible to improve workability of the fastening step.

The second fastening portion 44 can be formed, for example, by inserting the protrusion 42*p* of the second conductive member 42 into the through hole 41*h* of the first conductive member 41 and deforming the through hole 41*h* of the first conductive member 41 along the contour of the protrusion 42*p* of the second conductive member 42 to fix the inner wall of the through hole 41*h* by the second conductive member 42. Thereby, it is possible to improve the strength of the second fastening portion 44. In some preferred embodiments, the second fastening portion 44 is formed by fitting the through hole 41*h* of the first conductive member 41 and the protrusion 42*p* of the second conductive member 42 to each other. For example, the second fastening portion 44 can be formed by horizontally press-fitting the protrusion 42*p* of the second conductive member 42 to the through hole 41*h* of the first conductive member 41. Thereby, it is possible to improve workability of the fastening step.

In the metal joining step, the metal joining portion 45 is formed by metal joining, that is, by metallurgically joining the thin portion 41*t* of the first conductive member 41 and the flange portion 42*f* of the second conductive member 42 together. The metal joining step is performed after the fastening step, and thus the metal joining portion 45 having a stable shape can be formed with high accuracy. The metal joining portion 45 can be formed, for example, by welding a location where the thin portion 41*t* of the first conductive member 41 and the flange portion 42*f* of the second conductive member 42 are laminated on each other so as to penetrate the thin portion 41*t*. The metal joining portion 45 with high strength can be stably formed by welding. In some preferred embodiments, for example, the metal joining portion 45 is formed between the first fastening portion 43 and the second fastening portion 44 that are formed in the fastening step. Thereby, a joining location is hardly shifted, and workability of the metal joining step can be improved. Further, in a case where the metal joining portion 45 is formed by welding, a welding location hardly wobbles, and weldability can be improved. Further, in a case where the thin portion 41*t* is welded, less energy is required, and weldability can be improved.

Method of Manufacturing Battery 100

The battery 100 is characterized by using the positive electrode terminal 30 and/or the negative electrode terminal 40 manufactured by the above-described manufacturing method. The other manufacturing processes may be the same as those in the related art. The battery 100 can be manufactured, for example, by preparing the above-described electrode body 10, electrolyte, case body 22, lid 24, positive electrode terminal 30, and negative electrode terminal 40 and performing a manufacturing method including an attachment step and a joining step.

In the attachment step, the positive electrode terminal 30, the positive electrode lead member 13, the negative electrode terminal 40, and the negative electrode lead member 14 are attached to the lid 24. The negative electrode terminal 40 and the negative electrode lead member 14 are fixed to the lid 24, for example, by crimping process (riveting) as shown in FIG. 3. The crimping process is performed by interposing the gasket 50 between the negative electrode terminal 40 and the lid 24 and further interposing the insulator 60 between the lid 24 and the negative electrode lead member 14. In detail, the shaft column portion 42*s* before the crimping process of the negative electrode terminal 40 is made to pass through the cylinder portion 51 of the gasket 50, the terminal lead-out hole 24*h* of the lid 24, the through hole 60*h* of the insulator 60, and the through hole 14*h* of the negative electrode lead member 14 in order from above the lid 24 and to protrude below the lid 24. Then, the shaft column portion 42*s* protruding below the lid 24 is crimped so that a compression force is applied in the up-down direction Z. Thereby, the tack portion 40*c* is formed in a tip end portion (a lower end portion in FIG. 3) of the shaft column portion 42*s* of the negative electrode terminal 40.

By such crimping process, the base portion 52 of the gasket 50 and the flat plate-like portion of the insulator 60 are compressed, the gasket 50, the lid 24, the insulator 60, and the negative electrode lead member 14 are integrally fixed to the lid 24, and the terminal lead-out hole 24*h* is sealed. Meanwhile, a method of attaching the positive electrode terminal 30 and the positive electrode lead member 13 may also be the same as that for the above-described negative electrode terminal 40 and negative electrode lead member 14. The negative electrode lead member 14 is welded to the negative electrode current collector exposure portion of the negative electrode current collector 12, and the negative electrode of the electrode body 10 and the negative electrode terminal 40 are electrically connected to each other. Similarly, the positive electrode lead member 13 is welded to the positive electrode current collector exposure portion of the positive electrode current collector 11, and the positive electrode of the electrode body 10 and the positive electrode terminal 30 are electrically connected to each other. Thereby, the lid 24, the positive electrode terminal 30, the negative electrode terminal 40, and the electrode body 10 are integrally formed.

In the joining step, the electrode body 10 integrated with the lid 24 is accommodated in an internal space of the case body 22, and the case body 22 and the lid 24 are sealed. The sealing can be performed by welding such as laser welding. Thereafter, the battery 100 is sealed by injecting a non-aqueous electrolyte solution from a liquid injection port not shown in the drawing and closing the liquid injection port. As described above, the battery 100 can be manufactured.

Figure 8:
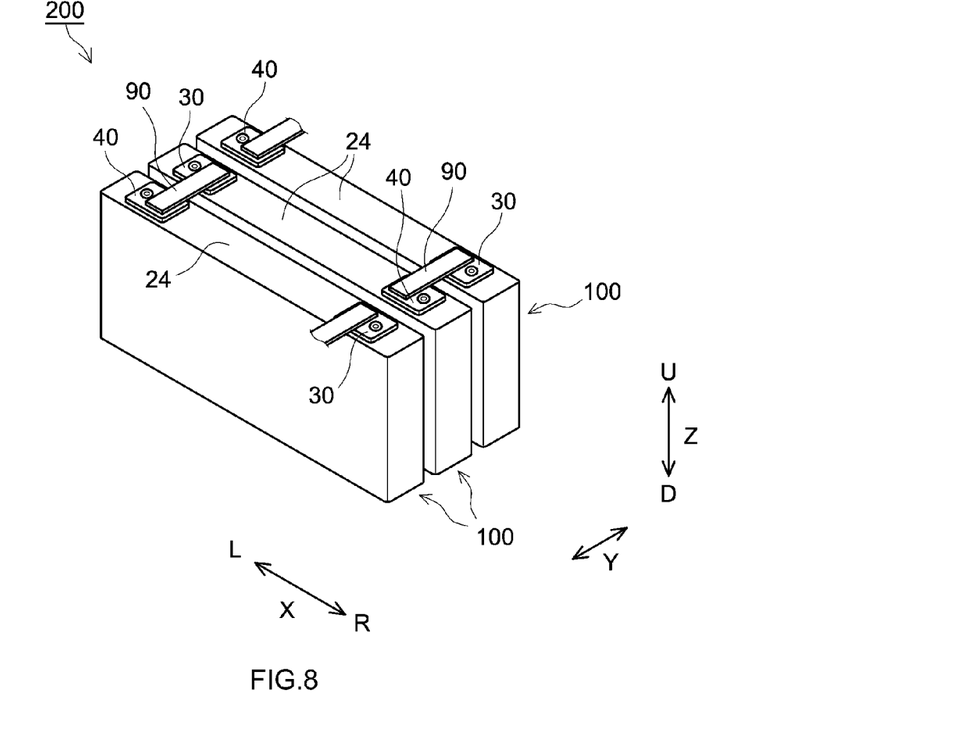
FIG. 8 is a perspective view schematically showing a battery pack according to an embodiment.

The battery 100 can be used in various applications, but can be suitably used in an application in which an external force such as vibration or an impact may be applied at the time of use, and can be typically used as a power source (driving power source) for a motor mounted on various vehicles such as a passenger car and a truck. Although the type of vehicle is not particularly limited, examples of the vehicle include a plug-in hybrid vehicle (PHV), a hybrid vehicle (HV), an electric vehicle (EV), and the like. As shown in FIG. 8, the battery 100 can also be suitably used as the battery pack 200 formed by electrically connecting multiple batteries 100 to each other through the bus bar 90. In this case, electrical connection between the multiple batteries 100 can be made by stretching, for example, the flat plate-shaped bus bars 90 between the extending portions 41*b* of the first conductive members 41. The bus bar 90 is formed of a conductive metal such as aluminum, an aluminum alloy, nickel, or stainless steel. The bus bar 90 and the extending portion 41*b* can be electrically connected to each other by welding such as laser welding.

Although some embodiments of the present disclosure have been described above, the embodiments are merely examples. The present disclosure can be implemented in various other modes. The present disclosure can be implemented on the basis of contents disclosed in the present specification and common technical knowledge in the art. The technology described in the claims includes various modifications and changes in the embodiments illustrated above. For example, some of the above-described embodiments can also be replaced with other modified modes, and other modified modes can also be added to the above-described embodiments. In addition, when the technical features are not described as essential, they can also be deleted appropriately.

For example, in the above-described embodiments, the first fastening portion 43 and the second fastening portion 44 are formed by the same fixing method. Specifically, the first fastening portion 43 and the second fastening portion 44 are fitting portions (for example, press fitting portions). However, there is no limitation thereto. The first fastening portion 43 and the second fastening portion 44 may be formed by different fixing methods. The second fastening portion 44 may be configured, for example, by inserting the protrusion 42p of the second conductive member 42 into the through hole 41h of the first conductive member 41 and then plastically deforming the protrusion 42p. For example, one fastening portion (for example, the first fastening portion 43) is a fitting portion (for example, a press fitting portion), and the other fastening portion (for example, the second fastening portion 44) may be a crimp portion.

Figure 9:
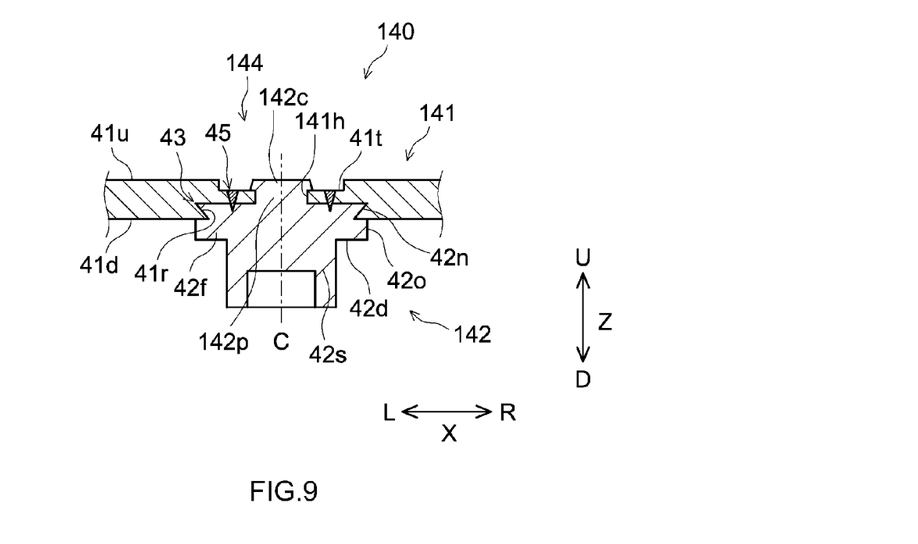
FIG. 9 is a longitudinal sectional view schematically showing main portions of a negative electrode terminal according to a modification example.

FIG. 9, which is a diagram corresponding to FIG. 7, is a longitudinal sectional view schematically showing main portions of a negative electrode terminal 140 according to a modification example. The negative electrode terminal 140 may be the same as the negative electrode terminal 40 mentioned above, except that the negative electrode terminal 140 includes a first conductive member 141, a second conductive member 142, and a second fastening portion 144. The first conductive member 141 may be the same as the first conductive member 41 mentioned above, except that the first conductive member 141 includes a columnar through hole 141h instead of the through hole 41h. The second conductive member 142 may be the same as the second conductive member 42 mentioned above, except that the second conductive member 142 includes a protrusion 142p formed to be able to be inserted into the through hole 141h before crimping process instead of the protrusion 42p. Crimping process is performed on a tip end portion (an upper end portion in FIG. 9) of the protrusion 142p. A crimp portion 142c is formed in a peripheral edge portion of the through hole 141h of the first conductive member 141. The second fastening portion 144 is a crimp portion. Thereby, it is possible to improve the strength of the second fastening portion 144 and improve workability at the time of forming the second fastening portion 144.

Further, for example, in the above-described embodiments, the negative electrode lead member 14 and the negative electrode terminal 40 are electrically connected to each other by deforming and crimping a lower end of the shaft column portion 42s of the negative electrode terminal 40. However, there is no limitation thereto. A method of electrically connecting the negative electrode lead member 14 and the negative electrode terminal 40 to each other may be, for example, mechanical fixing other than crimping process, may be metal joining represented by welding, or may be a combination thereof. From the viewpoint of increasing reliability of a connection portion, a fastening portion for mechanically fixing the negative electrode lead member 14 and the negative electrode terminal 40 and a metal joining portion for continuously or intermittently metal-joining a peripheral edge of the fastening portion may be formed in a connection portion between the negative electrode lead member 14 and the negative electrode terminal 40.

What is claimed is:

1. A terminal, comprising:
a first conductive member that has a plate shape;
a second conductive member that includes a flange portion electrically connected to the first conductive member;
a first fastening portion and a second fastening portion that mechanically fix the first conductive member and the flange portion of the second conductive member; and
a metal joining portion that metal-joins the first conductive member and the flange portion of the second conductive member, the metal joining portion being a welding joining portion provided at a position separate from the first fastening portion and the second fastening portion, wherein
the second fastening portion is provided further toward a center of the flange portion than the first fastening portion when seen in a plan view,
the first conductive member and the second conductive member are formed of a metal,
the first conductive member has a through hole,
the flange portion of the second conductive member has a protrusion to be inserted into the through hole,
the second fastening portion is configured such that the protrusion of the second conductive member is inserted into the through hole of the first conductive member, and
the second fastening portion is a crimp portion in which a tip end of the protrusion is crimped to a peripheral edge portion of the through hole.

2. The terminal according to claim 1, wherein
the metal joining portion is positioned between the first fastening portion and the second fastening portion when seen in the plan view.

3. The terminal according to claim 1, wherein
the first conductive member has a recessed portion that accommodates at least a portion of the flange portion of the second conductive member, and
the first fastening portion is configured such that an inner wall of the recessed portion of the first conductive member is fixed by the portion of the flange portion of the second conductive member accommodated in the recessed portion.

4. The terminal according to claim 1, wherein
the flange portion of the second conductive member has a narrow portion fitted to the first conductive member, and
the first fastening portion is a fitting portion in which the narrow portion of the second conductive member and the first conductive member are fitted to each other.

5. The terminal according to claim 4, wherein
the narrow portion is formed continuously or intermittently to have an annular shape on a side surface of the flange portion.

6. The terminal according to claim 1, wherein
the first conductive member has a substantially rectangular shape, and
a position of a center of the first conductive member and a position of the center of the flange portion of the second conductive member are shifted in a long side direction of the first conductive member.

7. A secondary battery, comprising:
a terminal including:
a first conductive member that has a plate shape;

a second conductive member that includes a flange portion electrically connected to the first conductive member;

a first fastening portion and a second fastening portion that mechanically fix the first conductive member and the flange portion of the second conductive member; and a metal joining portion that metal-joins the first conductive member and the flange portion of the second conductive member, the metal joining portion being a welding joining portion provided at a position separate from the first fastening portion and the second fastening portion, wherein the second fastening portion is provided further toward a center of the flange portion than the first fastening portion when seen in a plan view, the first conductive member and the second conductive member are formed of a metal, the first conductive member has a through hole, the flange portion of the second conductive member has a protrusion to be inserted into the through hole, the second fastening portion is configured such that the protrusion of the second conductive member is inserted into the through hole of the first conductive member, and the second fastening portion is a crimp portion in which a tip end of the protrusion is crimped to a peripheral edge portion of the through hole.

8. A terminal manufacturing method, comprising:

a fastening step of mechanically fixing a first conductive member that has a plate shape and a flange portion of a second conductive member to form a first fastening portion and a second fastening portion that electrically connect the first conductive member and the second conductive member; and after the fastening step, a metal joining step of forming a welding joining portion by welding the first conductive member and the flange portion of the second conductive member at a position separate from the first fastening portion and the second fastening portion, wherein the second fastening portion is provided further toward a center of the flange portion than the first fastening portion when seen in a plan view, and the first conductive member and the second conductive member are formed of a metal, wherein the first conductive member has a through hole, the flange portion of the second conductive member has a protrusion inserted into the through hole, and in the fastening step, the second fastening portion is formed by inserting the protrusion of the second conductive member into the through hole of the first conductive member and crimping a tip end of the protrusion to a peripheral edge portion of the through hole.

9. The terminal manufacturing method according to claim 8, wherein in the fastening step, the second fastening portion is formed after the first fastening portion is formed.

10. The terminal manufacturing method according to claim 8, wherein in the metal joining step, the welding joining portion is formed between the first fastening portion and the second fastening portion.

11. The terminal manufacturing method according to claim 8, wherein the first conductive member has a recessed portion that accommodates at least a portion of the flange portion of the second conductive member, and in the fastening step, the first fastening portion is formed by inserting the portion of the flange portion of the second conductive member into the recessed portion and deforming the recessed portion of the first conductive member along a contour of the second conductive member to fix an inner wall of the recessed portion by the second conductive member.

12. The terminal manufacturing method according to claim 8, wherein the flange portion of the second conductive member has a narrow portion fitted to the first conductive member, and in the fastening step, the first fastening portion is formed by fitting the first conductive member to the narrow portion of the second conductive member.

13. The terminal according to claim 1, wherein the welding joining portion is between a lower surface of the first conductive member and an upper surface of the second conductive member.

14. The terminal according to claim 1, wherein the welding joining portion is between a lower surface of the first conductive member and a portion of an upper surface of the flange portion that is positioned separate from the protrusion.

15. The terminal according to claim 3, wherein the flange portion has a further portion having a diameter larger than that of an opening of the recessed portion, and the further portion is arranged outside of the recessed portion.

16. The terminal according to claim 1, wherein the first conductive member includes a first recessed portion recessed along a first direction from a first surface of the first conductive member toward a second surface of the first conductive member, the second surface being opposite to the first surface in the first direction, a second recessed portion recessed along the first direction from the second surface toward the first surface, and the through hole extending along the first direction between the first recessed portion and the second recessed portion, and communicating the first recessed portion and the second recessed portion, wherein a dimension of the through hole in a second direction perpendicular to the first direction is less than that of the first recessed portion and the second recessed portion, an inner wall of the first conductive member defining the first recessed portion is tapered with respect to the first direction, the second conductive member includes a tapered portion at an outer peripheral portion of the flange portion, wherein an inclination of the tapered portion corresponds to that of the inner wall defining the first recessed portion, and the protrusion protruding from the flange portion along the first direction through the through hole, the first fastening portion is a fitting portion in which the tapered portion and the first recessed portion are fitted to each other, and the second fastening portion is the crimp portion wherein the crimp portion is the tip end of the protrusion crimped to the peripheral edge portion of the through hole at the second recessed portion.

* * * * *